Patented Sept. 13, 1927.

1,642,587

UNITED STATES PATENT OFFICE.

LEON LILIENFELD, OF VIENNA, AUSTRIA.

CELLULOSE COMPOUND AND PROCESS OF MAKING SAME.

No Drawing. Application filed July 23, 1924, Serial No. 727,807, and in Austria April 4, 1924.

According to this invention, new technically valuable cellulose compounds are made by acting on a cellulose-xanthic acid or a cellulose-xanthate with a mono-halogen derivative of a fatty acid.

The members of the hitherto unknown class of cellulose derivatives thus obtained may be arranged according to their properties in a number of groups. As an illustrative example, three groups of the new cellulose compounds will be described in respect of their properties of solubility.

To the first of these groups belong bodies which, particularly in the freshly-prepared condition, are soluble in water, usually in warm or hot water. The aqueous solutions leave on evaporation, shining, transparent layers or skins insoluble, or scarcely soluble in water at ordinary temperature.

The solubility in water which is characteristic of the first group is lacking in the second group. The solubility of their members in aqueous solutions of ammonia or of numerous organic bases of the aliphatic and aromatic series, however, is common to both groups. Remarkably weak solutions of these agents, for example, a solution of ammonia of only 0.01–0.02 per cent strength, or an aniline solution of 0.25–0.50 per cent strength, suffices to dissolve most of the members of the first and second groups. The solutions yield on drying, shining, transparent layers or skins, insoluble in water.

A further property of members of the first and second groups is the solubility in dilute solutions of alkali. Some dissolve in caustic soda solution containing a percentage of caustic soda lying in the third decimal place.

To the third group belong cellulose derivatives which are insoluble or only sparingly soluble in water and in aqueous solutions of ammonia or organic bases, but which dissolve in aqueous solutions of alkalies, to give solutions from which they may be precipitated by suitable precipitating agents, such as acids, salts, acid salts, alcohols, and the like. If such a solution be squirted through a fine orifice or slit into a suitable precipitating bath it solidifies to a thread or skin which after washing and drying is shining and transparent.

The present invention supplies a long-felt want in the chemistry and technology of colloids, inasmuch as it leads to a new emulsoid, whose solutions in water or in aqueous solutions of volatile or liquid solvents yield on drying clear, shining, pliable layers, which become insoluble in water, even during the evaporation or a simple subsequent heating operation, without being rendered turbid or unsightly by separation of crystals of by-products or impurities.

These properties render the new cellulose derivatives which can be obtained according to the invention suitable for numerous spheres of application. In general they find application in all processes wherein water-soluble colloids, such as starch, dextrin, glue (gelatin), albumen, gums, and the like, are used, and the insolubility in water of the technical product produced by drying constitutes a desirable advance. They may also be used for many purposes for which there are used cellulose derivatives which are insoluble in water and which can be rendered insoluble in water by physical or chemical means. The circumstance that the new cellulose derivatives render unnecessary a special decomposition process, washing process and in many cases a second drying process subsequent to the washing (as in finishes for textiles or in textile printing), and finally bleaching, fits them for many purposes in industry for which viscose cannot be applied, or can be applied only temporarily, on account of the extensive manipulation necessary.

The new cellulose derivatives also constitute valuable intermediate products for the synthetic manufacture of other important cellulose derivatives.

The invention consists in acting on a cellulose-xanthic acid (thionthiolcarbonic acid ester of cellulose) or on a cellulose-xanthate (a salt of thionthiolcarbonic acid ester of cellulose) with a mono-halogen derivative of a fatty acid, or with a salt or derivative thereof.

As parent materials for the invention, there come into question all the cellulose xanthic acids or cellulose-xanthates (viscose) which can be made by any known method with any practicable proportions of caustic alkali solution and carbon bisulphide. For the preparation of such viscoses there can be used bleached or unbleached cellulose as such in any form, in which it can be obtained in commerce, or a conversion product of cellulose, such as cellulose hydrate, hydrocellulose or oxycellulose or any cellulose derivative which still contains a free hydroxyl group to permit it to be converted into an ester of thionthiolcarbonic acid.

The cellulose-xanthic acids may be caused to react either in the form of their alkali compounds without alkali in excess (for example, a crude or purified form of viscose which has been neutralized or made acid by addition of a weak acid), or in the form of their alkali compounds with alkali in excess (for instance, a crude or purified viscose of alkaline reaction) or in the form of their compounds with other metals, such as zinc.

When using crude viscose, the parent material may be either the product of the reaction of carbon bisulphide on alkali cellulose before dissolution thereof, or a concentrated or dilute solution of viscose which can be made alkaline, neutral, or acid. If it is required to use a purified cellulose-xanthic acid, or a salt thereof for the invention, any known method of purification may be employed. For example, there may be mentioned precipitation by salt or by alcohol, with or without previous neutralization or acidification by means of a weak acid, and subsequent washing with a solution of salt, or with dilute alcohol; precipitation by carbonic acid with subsequent washing; treatment with sulphurous acid or with a bisulphite; dialysis and the like.

It is to be understood that, where the context permits, the terms "viscose", "cellulose-xanthic acid" and "cellulose-xanthate" used in the description and claims, include the forms of cellulose-xanthic acids and cellulose-xanthates (viscose) named in the two preceding paragraphs, and means both the free acids and salts.

The reaction between the cellulose-xanthic acid or cellulose-xanthate and the mono-halogen derivatives of a fatty acid occurs as a rule without extraneous heating. It can, however, if desired, be initiated or hastened by heating.

The final product of the reaction may be isolated from the reaction mixture either in the form of its salt, notably its alkali salt, or as the free acid.

A practicable method in the former case is for example the precipitation by a dehydrating agent, for example alcohol, acetone or the like or washing with an aqueous solution of the dehydrating agent and, if desired, drying; in the latter case, there may be used precipitation by an acid, by an acid salt, or by another agent which will fix the alkali (e. g. an ammonium salt), followed by washing with water and, if necessary, drying.

The cellulose derivatives which can be obtained according to the invention show the reactions characteristic of the xantho-fatty acids. When heated on the water-bath in neutral or alkaline solution they decompose yielding the respective thiohydroxyparaffin-mono-carboxylic acid, hydrogen sulphide, carbon dioxide and cellulose, or body of the cellulose group which formed the cellulose component of the reaction product. Their solutions in alkali decompose even at room temperature, splitting off the respective thio-hydroxy-paraffin-mono-carboxylic acid.

According to their mode of formation, behaviour and reactions therefore, the new cellulose compounds are cellulose-xanthic fatty acids (cellulose thionthiolcarbonic-hydroxy-paraffin-mono-carboxylic acids) and therefore compounds which are derived from fatty acids by substituting a cellulose xanthic residue for a hydrogen atom united to carbon.

The reaction in the simplest form (with sodium cellulose-xanthate and chloracetic acid) probably takes place according to the following equation:—

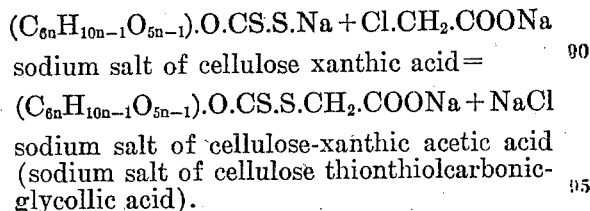

sodium salt of cellulose-xanthic acetic acid (sodium salt of cellulose thionthiolcarbonic-glycollic acid).

The invention is in no way limited to the above equation, which is intended to serve as an illustration, since the exhaustive and exact expression of the chemistry of the reaction is no simple matter which can be solved readily in view of our incomplete knowledge of the constitution of cellulose.

The following examples illustrate the invention, the parts being by weight:—

*Example 1.*

(a) 1000 parts of crude viscose (prepared for example by soaking 100 parts of sulphite-cellulose in fleece- or sheet-form with 1000 to 2000 parts of caustic soda solution of 18 per cent strength at 15° to 18° C. allowing the mass to remain for 3–24 hours at room temperature, pressing it until it becomes 300–350 parts, comminuting for instance in a shredder, or the like, if desired maturing for 6–72 hours at room temperature, treating it for several hours with 50–60 parts of carbon bisulphide, and dissolving it in sufficient water to bring the total weight of the solution to 1000 parts), corresponding with 100 parts of cellulose as parent material, are diluted when freshly prepared, or after standing for a short or long period (for example, from 6 hours to three days), with 5000 parts of water and treated with dilute acetic acid (for example, of strength from 5–10 per cent) whilst stirring, until the mixture shows a faintly alkaline or neutral reaction. As soon as the hydrogen sulphide liberated during the neutralization has escaped entirely or in greater part, the viscose, which has become light in colour, is treated with a solution of sodium monochloracetate prepared as follows:—60–100 parts of monochloracetic acid are dissolved in 480–800 parts of water and neutralized with powdered sodium bicarbonate. As soon as the solution of the sodium monochloracetate has been incorporated with the viscose, the mixture is stirred for a short time, and then allowed to stand at room temperature. After 6–48 hours the liquid mixture is treated whilst stirring with sulphuric acid of 1–3 per cent strength until it shows a strong acid reaction to congo, whereupon the product separates in the form of flocks or shreds. The precipitate is separated from the mother liquor by decantation, straining through cloth, filtration, centrifuging or the like, and washed with water until it is free from sulphuric acid. More especially during prolonged washing, it shows a tendency to swell and consequently to clog the pores of the filter cloth or paper. It may conveniently be washed by decantation or by centrifuging, or it may be washed by means of a constant flow of water in a vessel having one or more lateral sieves through which the water flows away. After several hours the washing is generally complete, and the product when freshly prepared is soluble in warm water. On evaporation of the aqueous solution there remains a transparent, shining, flexible skin, insoluble in water. The product is now (advantageously in thin layers) dried at atmospheric or reduced pressure, in some cases after centrifuging, or gently pressing, or it may be freed from water by one or more treatments with alcohol, being freed from alcohol, if desired, with ether, and dried.

The product, cellulose xanthacetic acid (cellulose - thionthiol - carbonic - glycollic acid), when dried directly, consists usually of scales, laminæ, skins or pieces, and when previously freed from water by means of alcohol, as a white, more or less flaky or powdery substance (the latter especially after grinding); it has the following solubilities and properties. It dissolves to a clear solution even in very dilute ammonia solution, for example of 0.01–0.05 per cent strength, which on drying yields shining, transparent skins, insoluble in water. The stability of the ammoniacal solution depends upon the content of the solution in ammonia and cellulose-xanth-acetic acid. As the content in ammonia increases, so also does the tendency to gelatinization. Thus a solution prepared with ammonia of 0.5 per cent strength gelatinizes shortly after its preparation. The cellulose-xanthacetic acid also dissolves readily in dilute aqueous solutions of aliphatic and aromatic amines, such as primary, secondary or tertiary amines, aniline, toluidine and the like. It dissolves readily even in an aqueous solution of aniline of 0.25–0.5 per cent strength. The clear, viscous solutions in aqueous aniline leave on drying lustrous, transparent, flexible skins or layers insoluble in water. The solutions in aqueous solutions of organic amines also show a tendency to gelatinize, especially when the solution of the base is comparatively strong, and this tendency becomes greater as the strength of the solution of the base is increased.

The cellulose-xanthacetic acid also dissolves in aqueous solutions of quaternary ammonium bases, in aqueous solutions of bodies of the urea series, for example, in a solution of urea of 1–10 per cent strength, in aqueous solutions of bodies of the guanidine series (for example in an aqueous solution of guanidine), and in aqueous solutions of bodies of the pyridine series (for example in an aqueous solution of pyridine). The solutions in aqueous pyridine are stable, and on drying they yield lustrous, transparent, flexible skins or layers.

The cellulose-xanthacetic acid also dissolves in water containing quinoline, in dilute sodium carbonate solutions (for example of 1 per cent strength) and in aqueous solutions of alkalies (for example a solution of caustic soda solution of 1 per cent strength). The solutions in aqueous alkalies decompose on standing at room temperature. For example a solution of the cellulose-xanthacetic acid of 5 per cent strength in aqueous caustic potash of 10 per cent strength gelatinizes in a period of from several hours to 12 hours. This gelatinization occurs as a result of the decomposition of the cellulose-xanthacetic acid into its cellulose-component, thio-glycollic acid, carbon dioxide and hydrogen sulphide. The thioglycollic acid and the nature of the cellulose components may easily be identified as follows:—After the jelly has been allowed to stand for some time (12–48 hours), it is ground in a mortar, treated with dilute sulphuric acid till it shows an acid reaction, and filtered. The filtrate is shaken with ether, and the ether is distilled. Thioglycollic acid remains, and gives with ferric chloride and ammonia the usual reddish-violet coloration. The jelly which is separated from the mother liquor is thoroughly washed, and then dried and powdered, if desired after removing the water by means of alcohol, and washing with ether. The product is insoluble in water, and in caustic soda solution of 5, 8, 10 and 15 per cent strength.

(b) The procedure is as in Example 1 (a) with the modification that the viscose is made distinctly or strongly acid by addition of dilute acetic acid.

The cellulose-xanthacetic acid which is obtained resembles in its properties and solubility that obtained in Example 1 (a).

Example 2.

(a) The procedure is as in Example 1 (a), with the difference that the viscose is not neutralized, and that there are used 80–120 parts of monochloracetic acid dissolved in 640–960 parts of water and neutralized with sodium bicarbonate.

The properties and solubilities of the fresh and dried cellulose-xanthacetic acid resemble those of the product of Example 1 (a).

(b) Instead of 80–120 parts of monochloracetic acid, there are added to the viscose only 60–70 parts dissolved in 480–560 parts of water and neutralized with sodium bicarbonate. The cellulose-xanthacetic acid so obtained differs from that obtained according to Example 2 (a) in that it is practically insoluble in water, or in hot water, when in the freshly prepared condition.

(c) The procedure is as in Example 2 (a) with the modification that for incorporation with the viscose there are used only 40 parts of monochloracetic acid in 320 parts of water, neutralized with sodium bicarbonate.

The cellulose-xanthacetic acid obtained is insoluble in water, aqueous ammonia, organic amines and pyridine. It is scarcely soluble in dilute solutions of alkalies, for example in a solution of caustic soda of 2–10 per cent strength.

Example 3.

1000 parts of viscose prepared as in Example 1 (a), and corresponding with 100 parts of cellulose as parent material, are diluted with 8500 parts of water, and treated, whilst stirring, with a solution of 100–120 parts of monochloracetic acid, previously dissolved in 1000–1200 parts of water and neutralized with powdered sodium bicarbonate. After standing for 24 hours the liquid reaction mixture is made strongly acid towards congo by addition of sulphuric acid solution of 3 per cent strength, the cellulose-xanthacetic acid which has separated in long white flakes is separated from the mother liquor in a suitable filtering apparatus, such as a straining cloth, a filter, a filter press, a centrifuge, or the like, and is washed with water until free from sulphuric acid. The product swells during the washing process to a voluminous, transparent jelly, which, however, does not dissolve appreciably in cold water, and can consequently be washed easily on a straining cloth.

If the jelly as such be warmed with or without addition of water on the water bath, it is converted into a clear solution, which leaves on drying lustrous, transparent, flexible skins or layers which are insoluble in water. The aqueous solution was found to remain unchanged for 4 weeks, after which the observation was discontinued. It yields with ferric chloride a white precipitate, with silver nitrate a precipitate which quickly turns brown and is soluble in ammonia, with copper sulphate a white precipitate and with mercuric chloride a white gelatinous precipitate.

The jelly, after washing, is dried in thin layers at atmospheric or reduced pressure, or it may be mixed with alcohol whilst kneading or stirring, treated several times with alcohol and dried, if desired after washing with ether. If the jelly be dried without treatment with alcohol the cellulose-xanthacetic acid is obtained in the form of transparent films or laminæ. If the product be freed from water by means of alcohol before drying, it is obtained in the form of a more or less fine powder, or of flakes.

The properties and solubilities of the dried body correspond with those of the cellulose-xanthacetic acid obtained in Example 1 (a).

Example 4.

1000 parts of viscose prepared as in Example 1 (a), and corresponding with 100 parts of cellulose as parent materials are diluted with 2000 parts of water and are treated whilst stirring, after having been neutralized or not, with 60–65 parts of monochloracetic acid, which have been dissolved in 100–130 parts of water and neutralized with powdered sodium bicarbonate. After standing for 24 hours the mixture is diluted with 5000 parts of water, and the cellulose-xanthacetic acid precipitated by addition of sulphuric acid of 1–3 per cent strength until the reaction is strongly acid. The remainder of the process is as in the previous examples. The dry, cellulose-xanthacetic acid possesses the following solubilities:—

The cellulose-xanthacetic acid obtained when the viscose is neutralized dissolves when freshly prepared in water, in aqueous ammonia, aqueous aniline and the other bases which have been mentioned.

Example 5.

(a) 1000 parts of viscose prepared as in Example 1 (a), corresponding with 100 parts of cellulose as parent material are diluted with 5000 parts of water, and treated, after having been neutralized or not, with 120–150 parts of $\alpha$-bromopropionic acid which have been dissolved in 1000–2000 parts of water and neutralized with sodium bicarbonate.

The reaction mixture is worked up as in Example 1 (a).

The $\alpha$-cellulose-xantho-propionic acid obtained resembles in its properties the cellulose-xanthacetic acid obtained in Example 1 (a). As would be expected, it gives on decomposition thio-lactic acid.

(b) The procedure is as in Example 5 (a), with the exception that 160–200 parts of α-bromobutyric acid are used instead of the α-bromopropionic acid.

The α-cellulose-xantho-butyric acid corresponds in its properties and solubilities with the cellulose-xanthacetic acid obtained in Example 1 (a). On decomposing it yields thio-α-hydroxybutyric acid.

Example 6.

1000 parts of a viscose (differing from that used in Example 1 (a) only in that there has been added to the solution of the product of the reaction between carbon-bisulphide and sodium cellulose, instead of water, a solution of caustic soda of 7 per cent strength) are diluted with 6000 parts of water and treated, whilst stirring with a solution of 130–135 parts of chloracetic acid in 135 parts of water. After 12–24 hours the mixture is mixed with alcohol of 96 per cent strength, whilst stirring, the precipitate is thoroughly washed with alcohol of 60–70 per cent strength, and is then dried, if desired after washing with ether.

The dry sodium cellulose-xanthacetate dissolves in water to a clear, viscous solution which on drying yields a transparent flexible skin soluble in water.

Example 7.

1000 parts of viscose prepared as in Example 1 (a) are precipitated in known manner by means of a saturated solution of common salt, and the precipitate is well washed with a salt solution of 10 per cent strength, pressed and dissolved in sufficient water to bring the total weight of the solution to 5000 parts. A titration of the purified viscose shows that it contains no caustic soda, and merely 2.2 per cent of sodium carbonate. It contains 1.51 per cent of dried cellulose as determined by precipitation with sulphuric acid, 5000 parts of the purified viscose are treated with a solution of sodium monochloracetate obtained by dissolving 50–70 parts of monochloracetic acid in 500–700 parts of water and neutralizing the solution with sodium bicarbonate, and the mixture is allowed to stand for 24 hours, after which it is treated, whilst stirring, with a solution of sulphuric acid of 3 per cent strength until it is strongly acid towards congo; the precipitate, which has separated, is washed with water until it is quite free from sulphuric acid. During the washing it swells considerably in the water without appreciably dissolving. The remainder of the process is the same as in the previous examples. The properties and solubilities of the xanthacetic acid which is obtained correspond with those of the product of Example 3.

In all the foregoing examples there may be used viscose preparations which differ from that used in Example 1 (a) in respect of the grade of sodium-cellulose and proportion of carbon bisulphide. For example the amount of sodium-cellulose may be reduced to only 200 parts, and treated with only 20–25 parts of carbon-bisulphide. The expression "monohalogen derivative of a fatty acid" or "halogen fatty acid" in general and in combination with a specified acid (e. g. monochloracetic acid or chloracetic acid) in the description and claims, is intended to include the monohalogen derivatives of fatty acids and the salts of these derivatives and the derivatives, for example esters of these derivatives, wherever the context permits.

The expression "cellulose-xantho-fatty acid" in the description and claims includes the free acids and their salts, particularly the salts with alkali metals, and means:—the compounds which are derived from a fatty acid by substituting for a hydrogen atom united to a carbon atom the residue of a cellulose-xanthic acid, in which the cellulose component of the cellulose-xanthic acid may be either cellulose itself or a conversion product of cellulose or a cellulose compound, that is to say, as far as the present invention is concerned, those products which are obtained by acting on a cellulose-xanthic acid or a cellulose-xanthate (viscose) with a monohalogen derivative of a fatty acid, or with a salt of such derivative, irrespective of whether the cellulose component of the cellulose-xanthic acid is cellulose, or a conversion product or a compound thereof.

I claim:

1. A process for the manufacture of new cellulose compounds, which comprises acting on a cellulose-xanthic acid with a mono-halogen derivative of a fatty acid.

2. A process for the manufacture of new cellulose compounds, which comprises acting on an alkaline solution of a cellulose-xanthic acid with a mono-halogen derivative of a fatty acid.

3. A process for the manufacture of new cellulose compounds, which comprises acting on a solution of a cellulose-xanthic acid with a mono-halogen derivative of a fatty acid.

4. A process for the manufacture of new cellulose compounds, which comprises acting on a viscose with a mono-halogen derivative of a fatty acid.

5. A process for the manufacture of new cellulose compounds, which comprises acting on purified viscose with a mono-halogen derivative of a fatty acid.

6. A process for the manufacture of new cellulose compounds, which comprises acting on viscose of alkaline reaction with a monohalogen derivative of a fatty acid.

7. A process for the manufacture of new cellulose compounds, which comprises acting on a cellulose-xanthic acid with mono-chloracetic acid.

8. A process for the manufacture of new cellulose compounds, which comprises acting on an alkaline solution of a cellulose-xanthic acid with mono-chloracetic acid.

9. A process for the manufacture of new cellulose compounds, which comprises acting on a solution of a cellulose-xanthic acid with mono-chloracetic acid.

10. A process for the manufacture of new cellulose compounds, which comprises acting on a viscose with monochloracetic acid.

11. A process for the manufacture of new cellulose compounds, which comprises acting on purified viscose with monochloracetic acid.

12. A process for the manufacture of new cellulose compounds, which comprises acting on viscose of alkaline reaction with monochloracetic acid.

13. A process for the manufacture of new cellulose compounds, which comprises acting on viscose material with a monohalogen derivative of a fatty acid and isolating the product from the reaction mixture by treating it with a precipitating agent.

14. A process for the manufacture of new cellulose compounds, which comprises acting on viscose with a monohalogen derivative of a fatty acid and isolating the product from the reaction mixture by treating it with an agent adapted to neutralize alkali.

15. A process for the manufacture of new cellulose compounds, which comprises acting on viscose with a monohalogen derivative of a fatty acid and isolating the product from the reaction mixture by treating it with a substance having an acid reaction.

16. A process for the manufacture of new cellulose compounds, which comprises acting on viscose with a monohalogen derivative of a fatty acid, treating the reaction mixture with a substance adapted to neutralize alkali, and washing the precipitate formed with an agent capable of dissolving the by-products of the reaction.

17. A process for the manufacture of new cellulose compounds, which comprises acting on viscose with a monohalogen derivative of a fatty acid, treating the reaction mixture with a substance adapted to neutralize alkali, and washing with water the precipitate formed.

18. As a new product, cellulose-xantho-fatty acid.

19. As a new product, cellulose-xanthacetic acid.

20. As a new product, cellulose-xantho-fatty acid which is soluble in water.

21. As a new product, cellulose-xanth-acetic acid which is soluble in water.

22. As a new product, cellulose-xantho-fatty acid which is soluble in aqueous ammonia and in aqueous solutions of organic bases.

23. As a new product, cellulose-xanth-acetic acid which is soluble in aqueous ammonia and in aqueous solutions of organic bases.

24. As a new product, an aqueous solution of cellulose-xantho-fatty acid.

25. As a new product, a solution of cellulose-xantho-fatty acid in an aqueous solution of liquid basic substances.

26. As a new product, a solution of cellulose-xantho-fatty acid in an aqueous solution of a volatile basic substance.

27. As a new product, cellulose-xantho-fatty acid, whose solution leaves, on drying, a residue insoluble in water.

28. As a new product, cellulose-xanth-acetic acid, whose solution leaves, on drying, a residue insoluble in water.

29. As a new product, cellulose-xantho-fatty acid, whose solution leaves, on drying and subsequent heating, a residue insoluble in water.

In testimony whereof I affix my signature.

LEON LILIENFELD.